United States Patent [19]

Morton

[11] Patent Number: 4,813,842
[45] Date of Patent: Mar. 21, 1989

[54] TAIL GATE APPARATUS FOR PICK-UP TRUCKS

[76] Inventor: R. C. Morton, 1005 Maple Ave., Yuba City, Calif. 95991

[21] Appl. No.: 172,759

[22] Filed: Mar. 28, 1988

[51] Int. Cl.$^4$ ............................................. B60P 1/44
[52] U.S. Cl. ...................................... 414/557; 296/62; 296/57.1
[58] Field of Search .................. 296/50, 51, 57 R, 61, 296/62; 414/557, 558, 545

[56] References Cited

U.S. PATENT DOCUMENTS

| | | | |
|---|---|---|---|
| 2,527,818 | 10/1950 | Ives | 414/557 |
| 2,683,540 | 7/1954 | Wood | 414/557 |
| 2,787,388 | 4/1957 | Spitler | 414/545 |
| 3,024,926 | 3/1962 | Nolden | 414/545 |
| 3,305,112 | 2/1967 | Brown | 414/557 |
| 3,700,123 | 10/1972 | Corley, Jr. | 414/557 |
| 3,779,406 | 12/1973 | Hermann | 414/557 |
| 3,795,329 | 3/1974 | Martin et al. | 414/545 |
| 3,853,369 | 12/1974 | Holden | 296/62 |
| 4,579,500 | 4/1986 | Robinson | 296/57 R X |
| 4,601,485 | 7/1986 | Furchak | 296/57 R X |

Primary Examiner—Robert B. Reeves
Assistant Examiner—Brian Sells
Attorney, Agent, or Firm—Mark C. Jacobs

[57] ABSTRACT

Tailgate apparatus for a pick-up truck comprising a frame assembly adapted to be mounted around the pre-existing bumper of a vehicle after removal of the conventional tail gate. The assembly does not require removal of the truck bumper and maintains the visibility of the license plate. Lifting and raising of the tail gate is provided by spool wound flexible straps on each side powered by a geared motor. A drive shaft under the platform interconnecting the side housings is driven by the motor rotating a first spool in one of the housings so that the spools rotate together. The apparatus is light weight and reliable in operation.

11 Claims, 3 Drawing Sheets

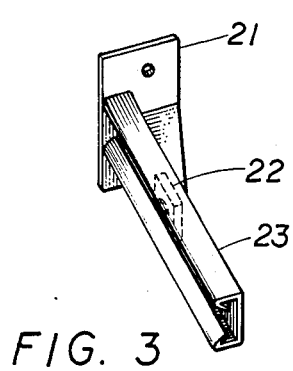
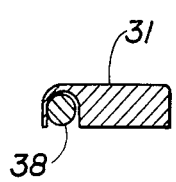
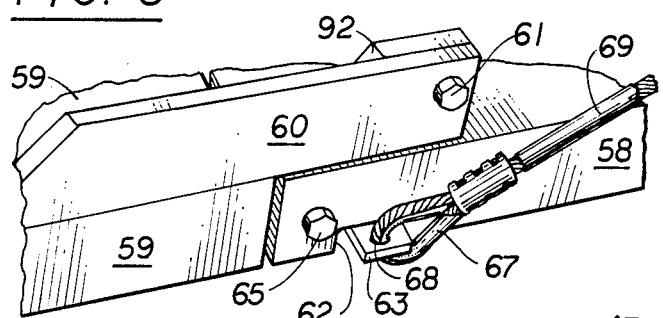
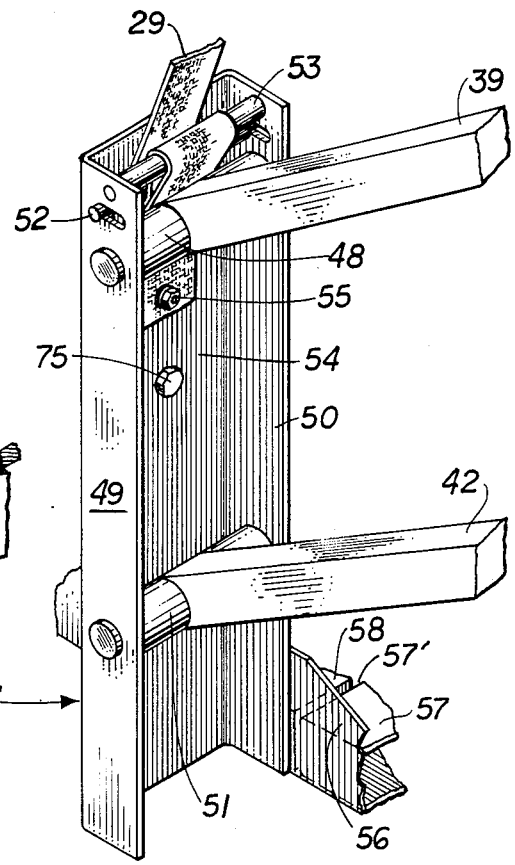
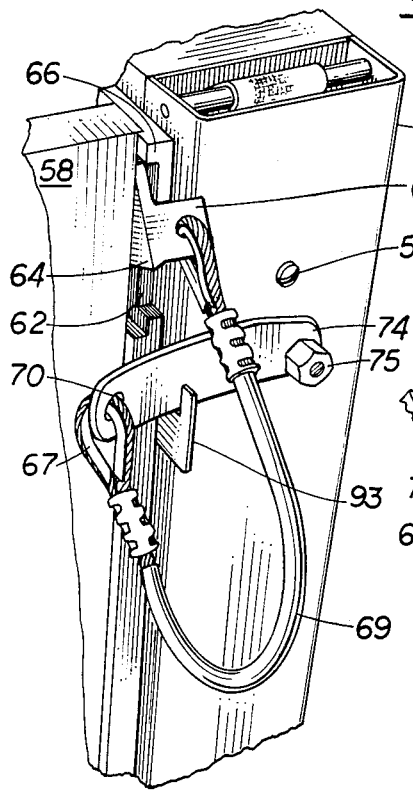
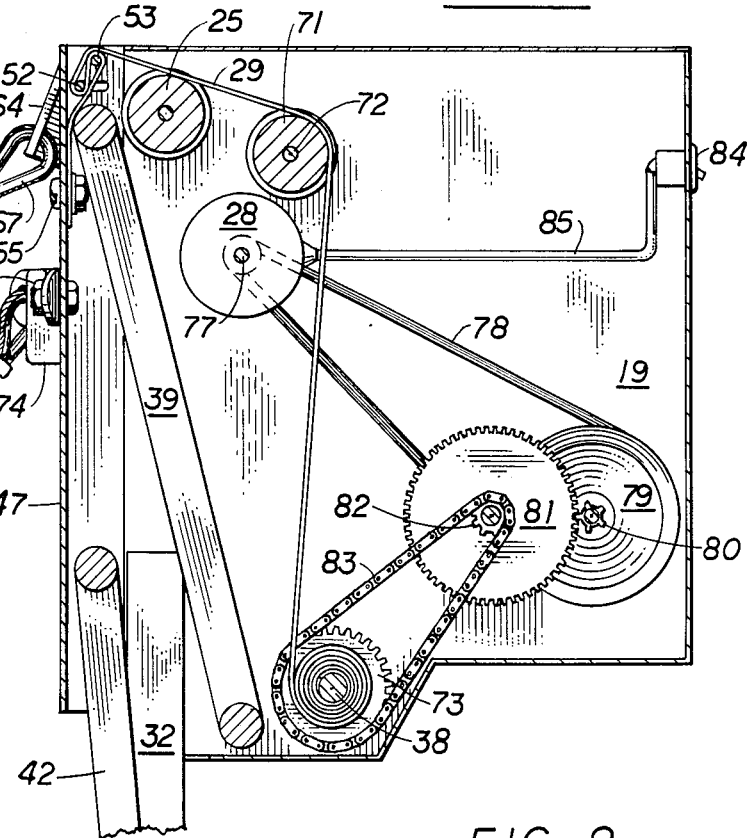

TAIL GATE APPARATUS FOR PICK-UP TRUCKS

BACKGROUND OF THE INVENTION

1. FIELD OF THE INVENTION

The invention relates to power operated tail gate apparatus; and, more particularly, to such apparatus which is quickly and easily attachable to the bumper and side walls with universal mounting bracket of a pick-up truck after removal of the conventional tail gate.

2. DESCRIPTION OF THE PRIOR ART

As a general rule, the tail gates of conventional pick-up trucks are merely pivoted about a point level with the truck bed and, thus, do not lower to the ground for lifting purposes. Thus, an after market has arisen to provide a tail gate apparatus which is attachable to the pick-up truck, after removal of the conventional tail gate, to provide a lifting surface. Such devices generally require removal of the vehicle bumper for installation and are quite heavy, as for example, 300 pounds or so. This is quite impractical for today's small pick-up trucks since such added weight throws off the balance of the vehicle, creates much wear and tear on the brakes, etc. Further, certain of these devices use hydraulic pistons for lifting. Since the fluids flow in the pistons is restricted in cold weather a very heavy lift gate is required so that it will go down to ground level when empty.

There is a need for a tail gate assembly which can be assembled to the preexisting bumper and side walls of a pick-up truck without need for removal thereof and provides a tail gate that can be raised and lowered quickly and efficiently without adding too much weight to the vehicle.

SUMMARY OF THE INVENTION

It is an object of this invention to provide an improved tail gate lifting assembly for pick-up trucks that is assembled thereto without need for removal of the vehicle bumper.

It is a further object of this invention to provide a tail gate lifting assembly using spool wound motor driven flexible straps as the lifting mechanism.

It is still further an object of this invention to provide such an assembly which is lighter in weight than conventional tail gate lifting assemblies.

These and other objects are preferably accomplished by providing a frame assembly adapted to be mounted to the preexisting bumper and side walls of a pick-up truck after removal of the conventional tail gate. The assembly does not require removal of the truck bumper and maintains the visibility of the license plate. Lifting and raising of the tail gate is provided by spool wound flexible straps on each side of the frame assembly powered by a geared motor. A drive shaft extends under a platform interconnecting side housings of the assembly and the motor rotates one of the spools driving the other spool through interconnection to the first spool so that the straps rotate together. The apparatus is light weight and reliable in operation.

BRIEF DESCRIPTION OF THE DRAWING

FIG. 3 is a vertical view showing a mounting bracket mounted to one of the side panels, as panel 15, of the truck in FIG. 1;

FIG. 4 is a section view taken along lines IV—IV of FIG. 2;

FIG. 5 is a detailed perspective view of the interior of one of the components of the apparatus of FIGS. 1 to 4 in the tail gate down position;

FIG. 6 is a detailed view of one side of the apparatus of FIGS. 1 to 4;

FIG. 7 is a detailed view of the other side of the apparatus shown in FIG. 6;

FIG. 8 is a view taken along lines VIII—VIII of FIG. 2; and

DESCRIPTION OF THE PREFERRED EMBODIMENT

Figure 1:
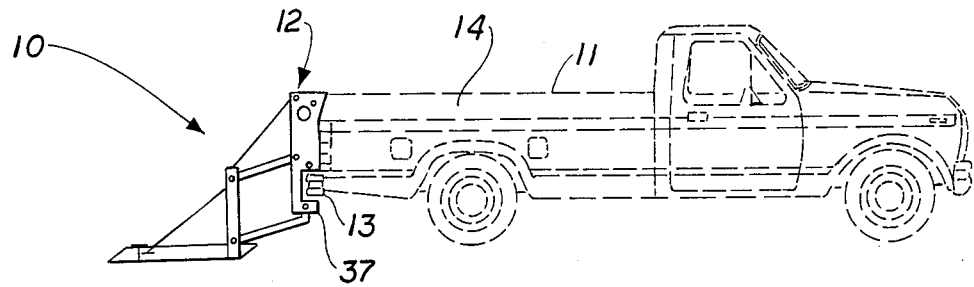
FIG. 1 is a vertical view of a pick-up truck having tail gate apparatus in accordance with the teachings of the invention mounted thereon.

Referring now of FIG. 1 of the drawing, a pick-up truck 10 is shown having a bed 11 and apparatus 12 in accordance with the invention installed at the rear of the bed 11. It is to be understood that the conventional tail gate of truck 10 has been removed and the apparatus 12 installed in its place. Apparatus 12 is mounted to the side panels 14 (right), 15 (left), (see also FIG. 3) without need for removal of bumper 13 as will be discussed.

Figure 2:
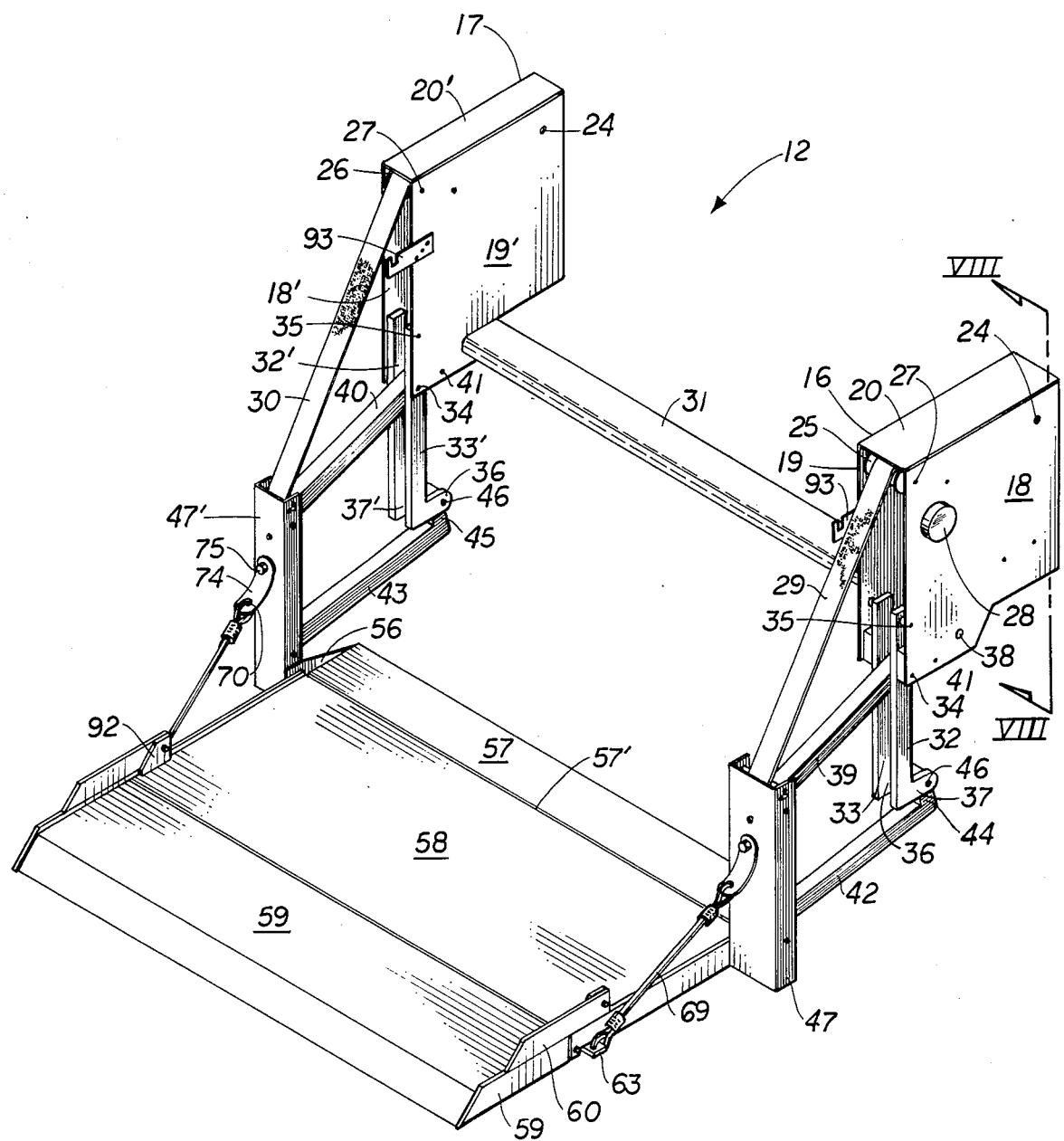
FIG. 2 is a perspective view of the tail gate apparatus alone of FIG. 1 removed from the truck.

Thus, apparatus 12 is shown in FIG. 2 and is comprised of a pair of side housings 16, 17, each housing 16, 17 being comprised of a pair of spaced apparatus panels 18, 19 on the right hand side and 18', 19' on the left hand side interconnected at the top by top panels 20 and 20' and open at the front, bottom and rear thereof 17 is seen to be a mirror image of 16.

As seen in FIG. 3, a universal mounting bracket 21 is mounted in any suitable manner to the interior bracing of each of the truck bed's outer side panels 14, 15. Thus each such side panel has a universal bracket 21 mounted thereto with a lockable nut 22 movable in a channel 23 of bracket 21. These brackets 21 can be installed where desired on the truck panels 14, 15 and suitable bolts (not visible) thread through apertures in the side panels 14, 15. Of course, more than one such bracket 21 and related bolts and apertures may be provided.

Referring again to FIG. 2, spools 25, 26 are journaled for rotation in the spacing between each spaced pair of side panels 18, 19. Each spool 25, 25 is fixed to a shaft 27 which shaft 27 is mounted between the respective side panels 18, 19. A motor 28 is mounted exteriorly of side panel 18 as will be discussed. Any suitable motor may be used, as a 1/6th HP motor, and any suitable gear train may be part of motor 28 as will be discussed.

A pair of flexible belts 29, 30, such as nylon webbing of any predetermined breaking strength, such as 8,000 pound test, wound over each spool 25, 26, respectively as will be discussed infra.

A platform 31 interconnects each side housing 16, 17 secured to apparatus panels 19 and 19' in any suitable manner. A pair of L-shaped brackets 32 and 32', 33 and 33' are secured interiorly of each set of apparatus panels 18, 18' and 19, 19' and secured thereto by screws 34, 35 or the like.

As seen in FIG. 2, the longer ends of brackets 32, 33 are secured to panels 18, 18', 19, 19' and the shorter leg portions 36, 36', 37, 37' extend below side housings 16, 17. These leg portions 36, 36', 37, 37' extend forwardly and, as seen in FIG. 1, hook under bumper 13.

As seen in FIGS. 2 and 4, a shaft 38 extends between side housings 16, 17 under platform 31. This shaft 38 is fixedly secured at each end to a roller 73 (FIG. 8) as will be discussed. Rods 39 and 40 (FIG. 2) are pivotally connected via cross pin 41 to and between side panel 18, 19, 18', 19'. A pair of rods 42, 43, having offset ends 44, 45, respectively, are pivotally connected via pins 46 to and between legs 36, 37, respectively. The free or forward ends of rods 39, 40 and 42, 43 extend to and are secured to a rectangular member 47, 47'.

As seen in FIG. 5, rod 39 has an integral cross-piece 48 journaled for rotation between the spaced side walls 49, 50 of each member 47. In like manner, the lower cross-rod 42 also has an integral cross-piece 51 journaled for rotation between side walls 49, 50.

As seen in FIG. 5, belt 29 goes over a first shaft 52 fixedly secured between side walls 49, 50, then up and over a second shaft 53 spaced from shaft 52 and also fixedly secured between side walls 49, 50, then downwardly and terminating at and secured to the inside wall 54 of member 47 via nut and bolt 55.

Also, as seen in FIG. 5, the lowermost end of side wall 50 is secured to, such as by welding, to a flange, 56. This flange 56 is in turn welded to rear platform section 57 and a mid platform section 58, FIG. 2 is hingedly connected thereto via hinge 57'. Such hinge 57' is of the type to allow section 58 to fold onto section 57, then return to a position lying in the same plane with respect thereto as is well known in the art. A third front platform section 59 (FIG. 2) is hingedly secured to mid platform section 58. This is accomplished by an upstanding flange 60 (FIG. 6 or FIG. 2) welded or otherwise secured to the upper edge of platform section 59 which flange 60 is in turn pivotally connected via pivot pin to a flange 92 welded or otherwise secured to the upper surface of mid platform section 58.

Also as seen in FIGS. 6 and 7, a cut out portion 62 is provided along the lower edges of mid platform section 58 receiving therein the leg 63 of a flat L-shaped plate 64 pivotally mounted via pin 65 to the lower edge flange 66 of platform section 58. A cable 67 with thimble 69 is looped and secured in an aperture 68 in leg 63 of plate 64. As seen in FIG. 2, the other end of cable 69 is looped and secured to an aperture 70 in flange plate 74 which is secured to the front face of members 47 via nut and bolt 75.

Figure 9:
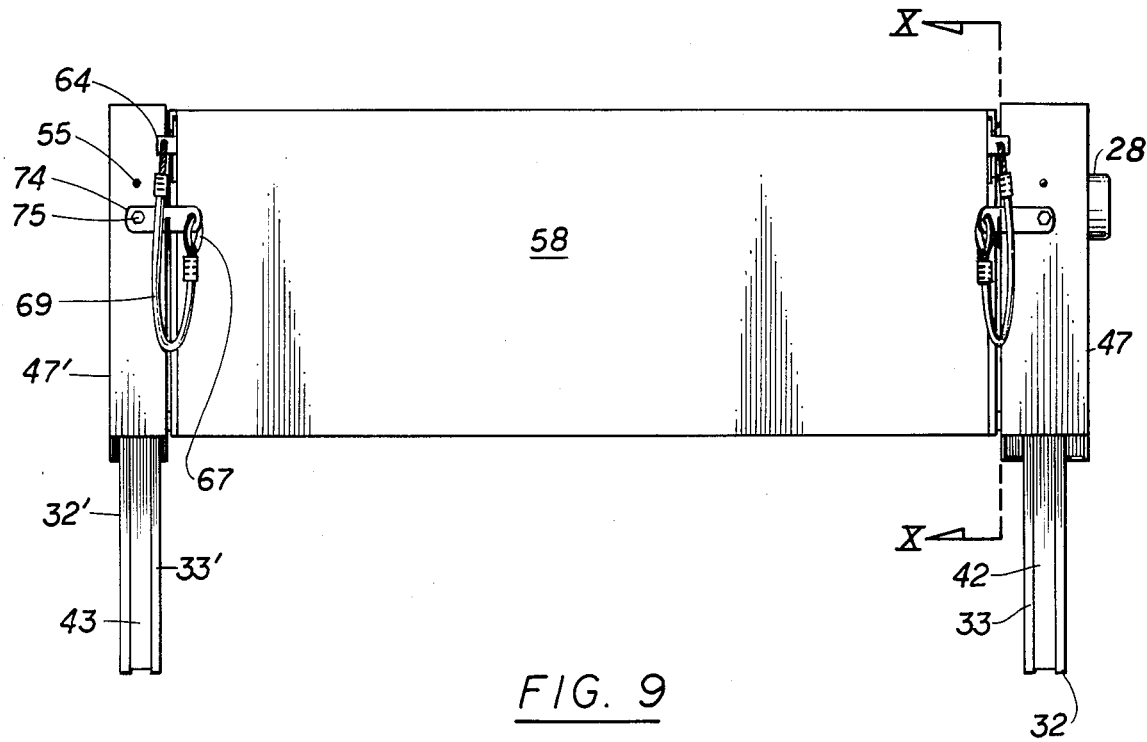
FIG. 9 is a view of the apparatus of FIGS. 1 to 8 removed from the vehicle showing the tail gate in the up or stored position.
Figure 10:
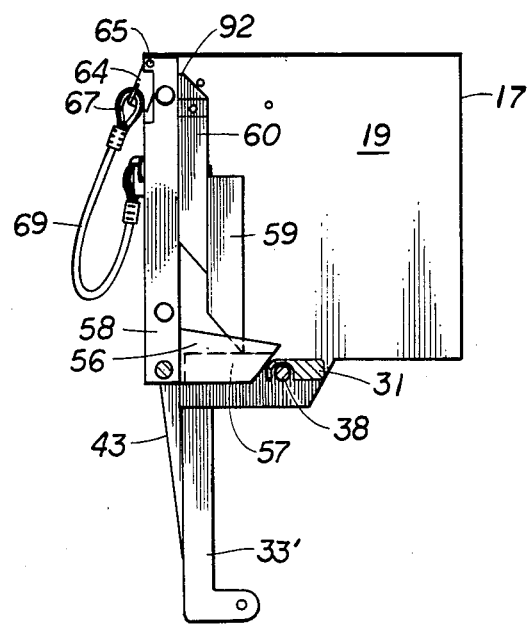
FIG. 10 is a sectional view along lines X—X of FIG. 9.

As seen in FIGS. 7 & 9, when the tail gate apparatus 12 is in the up position prior to release, plates 74 can be pivoted about nuts and bolts 75 to lie against mid platform section 58 and to slide into latch hook 93 to hold the same tailgate in the up position.

As heretofore discussed, the belt 29 extends over a first roller 25 (FIG. 8), then downwardly to and over a second roller 71, journaled for rotation between walls 18, 19, on shaft 72. Belt 29 is wound on and then secured to a spool 73 coupled to and driven by shaft 38 (which is coupled to both spools 73 in both side housings 16, 17). Shaft 38 is also coupled to motor 28 by the motors shaft 77 having a V-belt 78 coupled to pulley 79. Pulley 79 has a toothed pinion 80 engaging a toothed gear 81 having a chain sprocket 82 engaging chain 82 which in turn engages sprocket 73 which is mounted on shaft 38. A suitable on-off switch 84 is provided coupled to motor 28 by conduit 85. Pinion 80 may be a 5 tooth pinion and gear 81 may be a 60 tooth gear turning a 9 tooth sprocket turning chain 83. Sprocket 73 may include a 24 tooth sprocket. Of course, any suitable conventional variable reduction gearing may be provided. An optional tensioning means may also be provided.

In operation, apparatus 12 is assembled to truck 10 after removal of the conventional tail gate assembly and prior to installation of brackets 21. The apparatus 12 is mounted between the side panels 14 of truck 10 and the bumper 13 as seen in FIG. 1 without need for removal of bumper 13. The license plate of the vehicle 10 and tail lights are visible. Apparatus 12 is in the up or stored position shown in FIG. 9. After insulation to the bumpers it is attached to the brackets aforementioned.

Flange plates 74 are now pivoted about nut and bolt 75. Motor 28 is now activated to rotate shaft 38. Since shaft 38 is coupled to both spools 73 in both side housings 16 and 17, belts 29 and 30 are rotated simultaneously and in unison thus lowering the tail gate to the lower or lift position shown in FIG. 1. Front platform section 59 is pivoted from the folded to the unfolded position shown in FIG. 1.

The variable reduction gear drive for motor 28 adjusts for the load encountered and thus easily handles the transfer of power from the right to the left side of apparatus 12. The simplicity of the gear train and lifting belts allows a substantial reduction in weight which is essential in today's light weight and lightly powered trucks.

Any suitable materials, motors, gear boxes, steel, aluminum, etc. may be used. The belts may be of any suitable webbing material, such as nylon webbing, and of any suitable test strength, such as 8,000 pound test.

As seen in FIG. 1, a parallelogram effect is provided in the raising and lowering of the tailgate. This effect, along with the flat belt rather than a chain, provices better lifting force than in prior art systems. The same torque is present every time the system operates. The unique drive mechanism utilizing the flat belts allows the tail gate platforms, when in the down position—i.e. with the parallelogram arrangement being fully extended as seen in FIG. 1, and thus at a mechanical disadvantage—to use a high gear ratio via the variable gear drive to provide high lifting power at the start of the lifting stroke. As the platform sections 57, 58, 59 are raised, gear drive 76, motor 28, belts 29, 30 and related apparatus move the same faster and faster as the load on the relatively heavy trio of platform sections 57, 58, 59 decreases since the mechanical disadvantage of the bottom or FIG. 1 position is gone. That is, the system automatically adjusts for the change in weight and lift force required as the platform sections 57, 58, 59 are raised. High power and low speed is provided at the bottom of the stroke, then the speed increases at a relatively low gear ratio providing a moderately quick lifting speed.

Apparatus 12 fits most trucks without need for removing the bumper, as for example, all such model trucks since 1967. The extent of belts 29, 30, cables 69 and connection members 47 is selected to provide for the extent of lowering of the platform sections. Since no pistons or the like are used, the tail gate operating apparatus will not slow up in cold weather.

The side cables 69, FIG. 2 support the platform sections and are hinged via plates 64, FIG. 7 at pivot pin 65 to permit full closure of bed 58 shown in FIG. 9.

In conclusion, the apparatus disclosed herein incorporates a lifting mechanism having a flat belt gear reduction gearing which provides automatically varying gear ratio. This varying gear ratio compensates for the mechanical disadvantage at the beginning of the lift stroke (caused by inertia and the geometry of the lift arms) by having a lower gear ratio at that point. The varying gear ratio compensates for the decreased speed at the start of the cycle by increasing in speed at the top of the lifting cycle, where there is no mechanical disadvantage.

It is seen that the L-shaped members of this apparatus wrap around the bumpers of various trucks and permit the interchangability of this device with various truck models of the several manufacturers.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. Apparatus for providing a lift down tail gate for a vehicle having a bumper, a bed and interconnected side walls comprising:

a pair of spaced generally vertical housings adapted to be mounted between the side walls of the vehicle, each of said housings having a generally vertical front wall normally flush with said housing;

a pair of frame structures extending first vertically downwardly from each housing, then inwardly toward said housing for straddling the bumper of said vehicle;

a generally horizontal platform interconnecting said housings;

each of said housings having spaced upper and lower elongated rod members, the upper rod member being pivotally connected at one end to the upper portion of said housing and at the other end being pivotally connected to the upper end of said front wall and the lower rod member being pivotally connected at one end to said frame structure extending from said housing and at the other end being pivotally connected to the lower end of said front wall;

a tail gate structure having a first tail gate section secured between said front walls and a second tail gate section pivotally connected to said tail gate section including an elongated cable interconnecting each side of said second tail gate section to its respective front wall, wherein one end of said cable is connected to a flange plate pivotally mounted on the forward front face of said front wall and the other end is connected to a hinged flange mounted on the underside of said second tail gate section; and lifting and lowering means between each of said front walls and each of said housings for selectively and uniformly moving said front walls from a first position normally flush with said housing to a second position extending away and downwardly with respect to said housing thereby also moving said tail gate structure from a first position wherein the plane of said first tail gate section lies in generally the same vertical plane as said front wall to a second position where the plane of said first tail gate section extends in a direction perpendicular to the plane of said front wall.

2. In the apparatus of claim 1 wherein a third tail gate section is pivotally connected to said second tail gate section.

3. In the apparatus of claim 1 wherein said flange plate is movable from a first position within the extent of said front face to a second position extending laterally from said front face and beyond the extent thereof whereby said flange plate abuts against said second tail gate section when the latter is in the first position.

4. In the apparatus of claim 1 wherein said lifting and lowering means includes a flat flexible belt having one end wound on a spool rotatably mounted in said housing and the other end secured to said front wall.

5. In the apparatus of claim 4 wherein said belt is on nylon webbing.

6. In the apparatus of claim 4 wherein said lifting and lowering means includes a motor mounted on one of said housings engaging said spool therein for rotating the same.

7. In the apparatus of claim 6 wherein said lifting and lowering means includes gearing means associated with said spool in said last mentioned housing for controlling the rotation thereof.

8. In the apparatus of claim 6 wherein said lifting and lowering means includes a shaft connected at one end to said spool driven by said motor and rotated thereby, the other end of said shaft being connected to the spool in the other of said housing for simultaneously rotating both spools in both housings when said motor is actuated.

9. In the apparatus of claim 8 wherein said shaft extends below said platform.

10. In the apparatus of claim 1 wherein each of said frame structures comprises a pair of spaced L-shaped members having longer leg portions than the other leg portions forming said L-shaped members, said longer leg portions being connected to said housing and the shorter leg portions being adapted to extend under the bumper of a vehicle, said upper rod member being connected between the upper ends of said longer leg portions and the lower rod member having an offset portion interconnected to said shorter leg portions.

11. In the apparatus of claim 10 wherein said tail gate structure includes a third tail gate section pivotally connected to said second tail gate section.

* * * * *